United States Patent [19]

Sousa et al.

[11] Patent Number: 4,871,242
[45] Date of Patent: Oct. 3, 1989

[54] SOFT-FOCUS OPTICAL ELEMENT

[75] Inventors: Toshio Sousa, Narashino; Koichi Wakamiya, Tokyo; Hiroshi Wakabayashi, Yokohama; Hachiro Kanai, Kawasaki; Hidenori Miyamoto, Ichikawa, all of Japan

[73] Assignee: Nikon Corporation, Tokyo, Japan

[21] Appl. No.: 161,057

[22] Filed: Feb. 26, 1988

[30] Foreign Application Priority Data

Mar. 3, 1987 [JP] Japan .................................. 62-48355

[51] Int. Cl.$^4$ ............................................. G02B 5/02
[52] U.S. Cl. .................................................. 350/431
[58] Field of Search ........................................ 350/431

[56] References Cited

U.S. PATENT DOCUMENTS 2,959,105 11/1960 Sayanagi ............................ 350/431

Primary Examiner—Bruce Y. Arnold
Assistant Examiner—Rebecca D. Gass
Attorney, Agent, or Firm—Shapiro and Shapiro

[57] ABSTRACT

A soft-focus optical element has a light-transmitting surface formed with a plurality of low refractive index portions each in the form of a lens-like curved surface; the size of each low refractive-index portion is within the following range;

$$0.05 \text{ mm} \leq \phi \leq 0.5 \text{ mm} \quad (1)$$

and $$0.5\mu \leq h \leq 3\mu \quad (2)$$

where the diameter of the aperture of the low refractive-index portion is represented by $\phi$ and the height or depth between the light-transmitting surface and the top of the lens-shaped curved portion of the low refractive-index portion is presented by h; and the ratio S of the area of the plurality of low refractive-index portions to the area of the light-transmitting surface is defined as follows:

$$5\% \leq S \leq 35\% \quad (3)$$

The soft-focus optical element may be attached on an image-focusing lens.

9 Claims, 6 Drawing Sheets

SOFT-FOCUS OPTICAL ELEMENT

BACKGROUND OF THE INVENTION

1. Field of the Invention

The present invention relates to an optical element for special-effect exposure which is attached to a photographic lens, a video camera lens or the like or which is used as a component of a lens and more particularly a soft-focus lens best adapted to obtain an image with soft gradation.

2. Related Background Art

In order to obtain portraits, landscape pictures and the like all of which have a soft gradation, soft-focus lenses designed and constructed for obtaining images with soft gradation have been used. These soft-focus photographic lenses have a high degree of soft-focus effect and a high degree of beautiful vignette, but they are highly expensive, and the effect of soft focus varies over a wide range when a photographic lens is set to a low aperture so that in order to attain a high degree of soft-focus effect, special photographic techniques are required. Therefore, instead of the above-described soft-focus photographic lenses, various types of soft-focus filters have been proposed and demonstrated so that when they are attached to the conventional sharp-focus lenses, photographic pictures and images with soft gradation can be obtained.

Various types of soft-focus filters are available. For example, in one soft-focus filter, a plurality of fine coaxial grooves are formed on the light-transmitting surface of the filter. In another type, a large number of great and small frosted projections and recesses are defined on a light-transmitting surface. In a further filter, a plurality of lens-like projections are extended in a predetermined regular pattern from a light-transmitting surface. In yet another type, a plurality of projected phase portions are defined so as to attain phase differences from a light-transmitting surface. In yet a further type, a surface of glass is formed with spots each having a different refractive index by an ion exchange process. The following conditions must be satisfied even when such soft-focus filters are attached to the photographic lenses in order to obtain a satisfactory degree of soft-focus effect as in the case of the conventional soft-focus photographic lenses:

(1) In response to the resolving power of a photographic lens upon which a soft-focus filter is mounted, sharply focused images must remain faithfully at each image-focusing point.

(2) A degree of vignette of a focused picture must be high and it must not produce a ring-shaped vignette around a bright point image and straight-line-like flashes of light around a bright configuration as in the case of the so-called two-line vignette.

(3) The range and the degree of blurs due to the vignette of an image are within a satisfactory range, respectively.

There has not yet been proposed, however, a soft-focus filter which can satisfy all of the conditions described above. For instance, in the case of a filter having a plurality of coaxial grooves at the light-transmitting surface, a ring-shaped vignette occurs around a bright image of a point light source so that the adverse effects of the so-called two-line vignette are aggravated, and consequently it is becomes impossible to obtain beautiful vignette. In a case of a filter of the type in which a large number of frosted projections and recesses are defined on the light-transmitting surface, the contrast of the whole image is degraded due to the scattered light rays emitted from the surface with projections and recesses, so that the resolving power of an image is degraded and consequently a soft-focus image with natural vignette cannot be obtained. Furthermore, in the case of a conventional filter of the type having a plurality of lens-shaped projections extended from the light-transmitting surface, water-drop-shaped projections each having a relatively large diameter are regularly arrayed over the whole surface of the light-transmitting surfaces so that vignette around the image of a point light source is extremely evident and does not constitute a gentle blur. As a result, ring-shaped vignette tends to occur, so that the so-called degree of vignette is degraded.

Furthermore, in the case of a phase difference type filter, the degree of vignette is dependent upon the wavelengths of light rays, so that the decrease in contrast can only be obtained in response to a specific wavelength of light; and furthermore the tendency of generating the so-called two-line blur is increased, whereby beautiful vignette effects cannot be attained. In addition, in order to obtain a predetermined phase difference, the lens surface must be finished with an extremely high degree of dimensional accuracy, so that the fabrication of such filters is difficult and is very expensive. In the case of a soft-focus filter fabricated by an ion exchange process, the soft-focus effect substantially similar to that obtained by a soft-focus photographic lens can be attained, but there is the problem that only specific materials can be used and the production cost becomes high.

SUMMARY OF THE INVENTION

In view of the above, the primary object of a present invention is to provide a soft-focus optical element which can solve the problems encountered in the conventional filters, can maintain a satisfactory degree of soft-focus effect regardless of the F-number of a lens upon which the filter is mounted, and can be produced in a simple, inexpensive manner.

To the above and other ends, according to the present invention, a light-transmitting surface is formed with a plurality of low refractive index portions each in the form of a lens-like curved surface. The size of each small refractive-index portion is within the following range:

$$0.05 \text{ mm} \leq \phi \leq 0.5 \text{ mm} \tag{1}$$

and $$0.5 \mu \leq h \leq 3 \mu \tag{2}$$

where the diameter of the aperture of the low refractive-index portion is represented by $\phi$ and the height or depth between the light-transmitting surface and the top of the lens-shaped curved portion of the low refractive-index portion is presented by h; the ratio S of the area of the plurality of low refractive-index portions to the area of the light-transmitting surface is defined as follows:

$$5\% \leq S \leq 35\% \tag{3}$$

The soft-focus optical element in accordance with the present invention is attached on an image-focusing lens. Then each low refractive-index portion which has the lens-shaped curved surface refracts part of the light rays which are focused as a point image on the focal plane by the image-forming lens so that the images are focused at different positions. In this case the light rays which pass through a low refractive-index portion and are incident on the point image are distributed over the focal plane over a range whose center is the point image. The area over which the light rays are distributed is dependent on the diameter $\phi$ of the low refractive-index portion and the height h of the lens-shaped curved surface. Furthermore, the quantity of light which is expanded and distributed is dependent upon the average density of a plurality of low refractive-index portions; that is, the value of the ratio S of the sectional area of the light-transmitting surface of the optical element to the whole area of the low refractive-index portions. It follows, therefore, that when $\phi$, h and S are determined to satisfy the following conditions a satisfactory degree of soft-focus effect can be attained:

$$0.05 \text{ mm} \leq \phi \leq 0.5 \text{ mm} \tag{1}$$

$$0.5 \mu \leq h \leq 3\mu \tag{2}$$

and $$5\% \leq S \leq 35\% \tag{3}.$$

If the size of the low refractive-index portions having the lens-shaped curved surface becomes less than the lower limits defined by Eqs. (1) and (2), the formation of the lens-shaped curve becomes extremely difficult. In addition, when the ratio S becomes lower than the lower limit defined by Eq. (3), the soft-focus effect is reduced, so that the objects of the soft-focus optical element cannot be obtained.

When the size becomes in excess of the upper limits defined by Eqs. (1) and (2), the degree of an image blur is degraded, and when the ratio S is in excess of the upper limit defined by Eq. (3), the contrast of the image surface is extremely reduced and the ring-shaped blur and the so-called two-line blur occur, so that satisfactory soft-focus effect cannot be obtained.

According to the present invention, the diameter of a low refractive-index portion and the height of the lens-shaped curved surface are defined considerably smaller in size as compared with the conventional filters having water-drop-shaped projections, so that it becomes possible that the resolving power of the image-focusing lens on which the optical element of the present invention is mounted can be suitably maintained and the satisfactory soft-focus effect can be obtained. When the optical element of the present invention has the same average density as the conventional filters, the light refracting portions are considerably increased in number so that the degree of vignette is satisfactory and there arises no problem that the ring-shaped blurs and the so-called two-line blurs occur.

The above and other object, effects, features and advantages of the present invention will become more apparent from the following description of the preferred embodiments thereof taken in connection with the accompanying drawings.

BRIEF DESCRIPTION OF THE DRAWINGS

FIG. 7 showing the characteristic curves when the radius of the curved surface of each low refractive-index portion is 8.5 mm and the low refractive-index portion is $1.5\mu$ in height and 0.35 mm in diameter; and FIG. 8 showing the characteristic curves when the radius of the curved surface of each low-refractive-index portion is 2.8 mm and each low-refractive-index portion is $1.8\mu$ in height and 0.20 mm in diameter;

DESCRIPTION OF THE PREFERRED EMBODIMENTS

Figure 1:
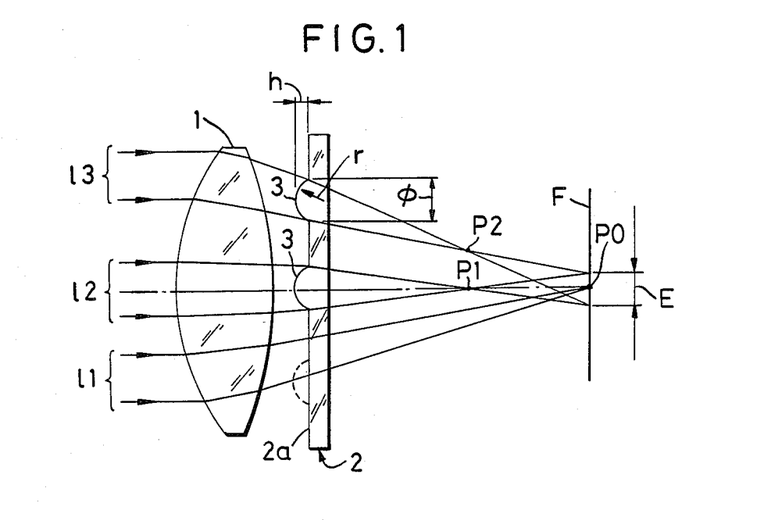
FIG. 1 is a view used to explain the soft-focus principle of a preferred embodiment in accordance with the present invention.

FIG. 1 is a view used to explain the underlying principle of the present invention; that is, a soft-focus optical element having a plurality of lens-shaped low-refractive-index portions extended from the light transmitting surface of the optical element. According to the soft-focus optical element shown in FIG. 1, a light ray which passes through a low-refractive-index portion is refracted so that the light ray is deviated from the image focused by an image focusing lens on which the optical element is mounted, so that a blur circle is produced around the focused image, thereby producing the soft-focus effect. For sake of the easy understanding of the underlying principle of the present invention, it is assumed that the soft-focus optical element having a plurality of lens shaped low-refractive-index portions is interposed between the image focusing lens and a focal plane (for instance, the surface of a film).

Referring still to FIG. 1, if the aberrations of the image focusing lens 1 are almost negligible, the luminous flux $l_1$ which has not passed through a lens-shaped projection 3 of the soft-focus optical element (to be referred to as "a filter" hereinafter in this specification) 2 passes through the light transmitting surface 2a and is focused at a single point Po on a focal plane. The luminous flux $l_2$ which passes through the image focusing lens 1 and a lens-shaped projection 3 toward the point Po is refracted by the lens-shaped projection 3 so that it is focused at a point $P_1$ which is deviated from the point Po and defines an expanded portion E whose center is the point Po in the vicinity of the focal plane F. It may be considered that the expanded portion E is defined due to the combination of the influences of geometrical aberrations and diffraction of the light rays due to the lens-shaped projection 3, and the size (area) of the expanded portion is varied in response accordance with the radius of curvature at the top of the lens-shaped projection and its diameter $\phi$.

The luminous flux $l_3$ which passes through another lens-shaped projection 3 is focused at a point $P_2$ deviated from the point Po toward the optic axis and is also expanded at a diameter substantially similar to that of the expanded portion E around the point Po as a center. Thus, it may considered that when there exist a plurality of lens-shaped projections 3, the intensity of light and the distribution of quantity of light on the focal plane F of the luminous fluxes which have passed through the lens-shaped projections 3 and are expanded or enlarged around the point Po as a center, depending upon the superimposed integration of the luminous fluxes passing through the lens-shaped projections 3, respectively. Therefore, when the lens-shaped projections are reduced in size but increased in number and the ratio of the total area of the lens-shaped projections 3 to the area of the transmission surface area of the filter is increased, the quantity of light of the focused image converged or focused at the point Po is reduced while the sum of the luminous fluxes which are expanded by the lens-shaped projections 3 is relatively increased, whereby the soft-focus effect is enhanced.

When the luminous flux passing through each lens-shaped projection 3 has no aberration, it is expected that the expanded region E in the vicinity of the focused image point Po and the distribution of quantity of light are substantially similar, but in practice due to the optical aberrations, the expanded portion E is varied in size, position and the distribution of quantity of light. When the luminous flux passing through each lens-shaped projection 3 is superposed, the above-described variations serve to make a gentle distribution of quantity of light around the optical image focused by the image focusing lens as a center so that they have very strong effects to eliminate a ring-shaped blur and the so-called two-line blur.

Figure 2A:
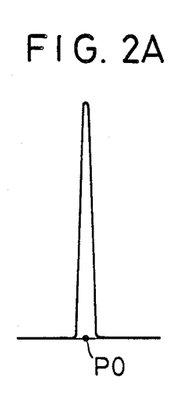
FIG. 2A shows the distribution of the quantity of light of a focused point of an image-focusing lens without a soft-focus optical element.
Figure 2B:
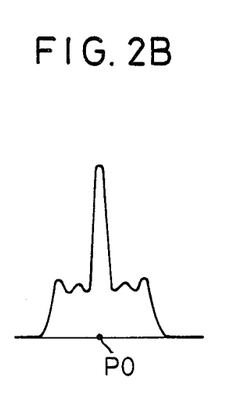
FIGS. 2B and 2C show distributions, of the quantities of light when a soft-focus optical element of the present invention is inserted.
Figure 2C:
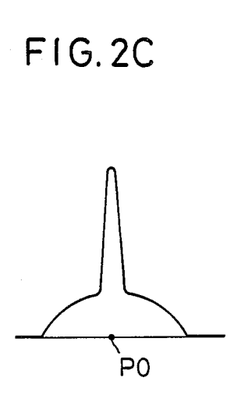

FIGS. 2A, 2B and 2C are views illustrating the distributions of quantity of light at the focused image point Po. FIG. 2A shows the distribution of quantity of light passing only through the image focusing lens 1 without the soft-focus filter 2 and also indicates that the distribution width is narrow and the intensity of light at the center is high, so that an extremely sharp image is obtained. FIG. 2B shows the distribution when the lens-shaped projections 3 are large in size but small in number, so that the expansions of luminous fluxes passing through the lens-shaped projections completely coincide with each other. Furthermore, at the peripheral portion the luminous intensity rises more rapidly than at the intermediate portion due to the influence of diffraction of light. In the case of such distribution of quantity of light, the intensity at the intermediate portion is relatively high and the intensity at the peripheral portion becomes higher, so that a sharp and clear image cannot be attained; extremely sharp blurs are observed; and the ring-shaped blur frequently tends to occur. FIG. 2C shows the focused image when the lens-shaped projections are small in size but large in number. As a result, the aberrations and diffraction of light passing through each lens-shaped projection 3 are deviated, so that the distribution of quantity of light is decreased gently toward the peripheral portion. As a result, the scope and degree of blur due to the vignetting of the focused image become satisfactory. It follows, therefore, that it is preferable that the lens-shaped projections are reduced in size, but increased in number.

Figure 3:
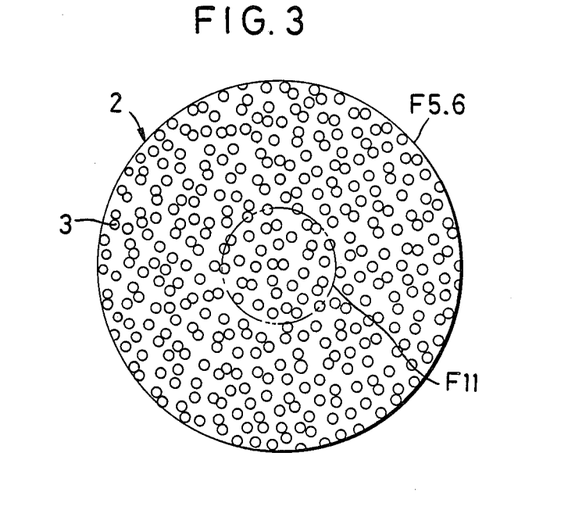
FIG. 3 is a top view of a preferred embodiment of a soft-focus optical element in accordance with the present invention.
Figure 4:
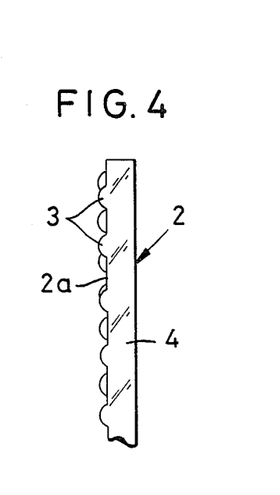
FIG. 4 is a fragmentary sectional view, on an enlarged scale, thereof.
Figure 5:
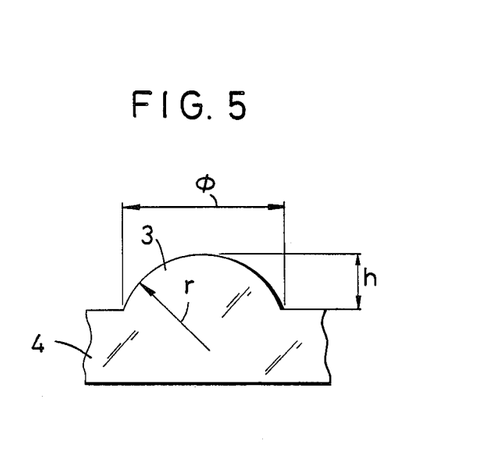
FIG. 5 is a sectional view, on an enlarged scale, of a low refractive-index portion of the optical element shown in FIG. 3.

FIG. 3 is a top view, on enlarged scale of a soft-focus filter based upon the above-described underlying principle of the present invention; FIG. 4 is a fragmentary sectional view thereof; and FIG. 5 is a view, on enlarged scale of a lens-shaped projection shown in FIG. 3.

A perceived better or satisfactory soft-focus state is somewhat subjective, and its evaluation is different among viewers having different sensitivities so that the degree of soft-focus state cannot be defined objectively. With this in mind, the inventors used a photographic lens whose optical aberrations are satisfactorily corrected and upon which is mounted a soft-focus filter so at to compare M.T.F. (Modulation Transfer Function) with respect to the spatial frequency. The results were drawn in the form of a graph, and furthermore, actual exposures were compared in order to obtain satisfactory conditions. FIG. 3 shows a filter 2 in which, as shown in FIG. 4, a large number of extremely fine lens-shaped projections 3 are formed integral with one major surface of a transparent plate 4. As shown in FIG. 3, the lens-shaped projections 3 are not regularly distributed, but are defined at random and are distributed on an average over one whole major surface. When the radius of curvature is represented by r; the height from said one major surface to the vertex of the curved surface is designated by h, and furthermore, when it is assumed that the curved surface is a completely spherical surface as shown in FIG. 5, the diameter $\phi$ of the lens-shaped projection 3 (the diameter of a cross section at the light-transmitting surface 2a) is expressed by the following equation:

$$\phi = 2\sqrt{2rh - h^2}$$

Therefore, when the values of $\phi$ and h are actually measured, it becomes possible to obtain a radius of curvature. Furthermore a ratio of the regional area of a plurality of lens-shaped projections 3 to the whole light transmitting surface of the filter S (%) can be obtained from the diameter $\phi$ and the number of the lens-shaped projections 3 and the diameter of the light-transmitting surface.

The size (r, h, φ) of the lens-shaped projections 3 of the filters designed and fabricated based upon the above-described underlying principle of the present invention and used in the experiments conducted by the inventors are shown in TABLE 1.

TABLE 1

| Specimen Code | Mark of a MTF curve | Lens-shaped projections | | |
|---|---|---|---|---|
| | | S (area ratio in %) | r (mm) | h (μ) | φ (mm) |
| A3-16 | $A_1$ | 16 | | | |
| A3-20 | $A_2$ | 20 | 3.2 | 0.9 | 0.15 |
| A3-24 | $A_3$ | 24 | | | |
| B5-14 | $B_1$ | 14 | | | |
| B5-16 | $B_2$ | 16 | | | |
| B-18 | $B_3$ | 18 | | | |
| B5-20 | $B_4$ | 20 | 2.8 | 1.8 | 0.20 |
| B5-25 | $B_5$ | 25 | | | |
| B5-30 | $B_6$ | 30 | | | |
| B5-35 | $B_7$ | 35 | | | |
| C5-16 | $C_1$ | 16 | | | |
| C5-20 | $C_2$ | 20 | | | |
| C5-25 | $C_3$ | 25 | 8.5 | 1.8 | 0.35 |
| C5-30 | $C_4$ | 30 | | | |

Figure 6:
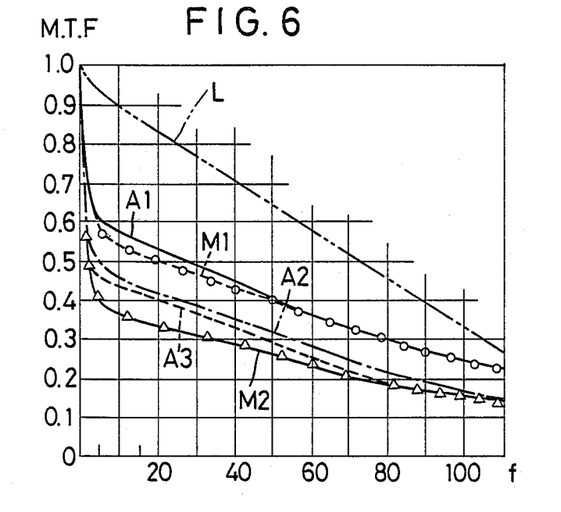
FIGS. 6 to 8 show spatial frequency characteristic curves, of the low refractive-index portions of the optical element shown in FIG. 3, FIG. 6 showing the characteristic curves when the curved surface of each low refractive-index portion is 3.2 mm in radius, and each low refractive-index portion is $1.5\mu$ in height and 0.15 mm in diameter.
Figure 7:
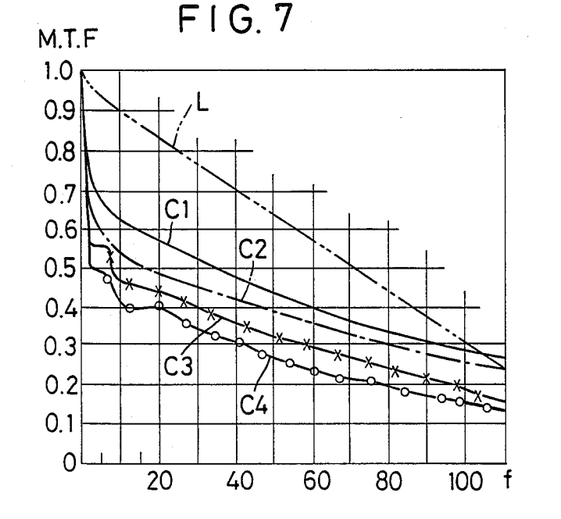
Figure 8:
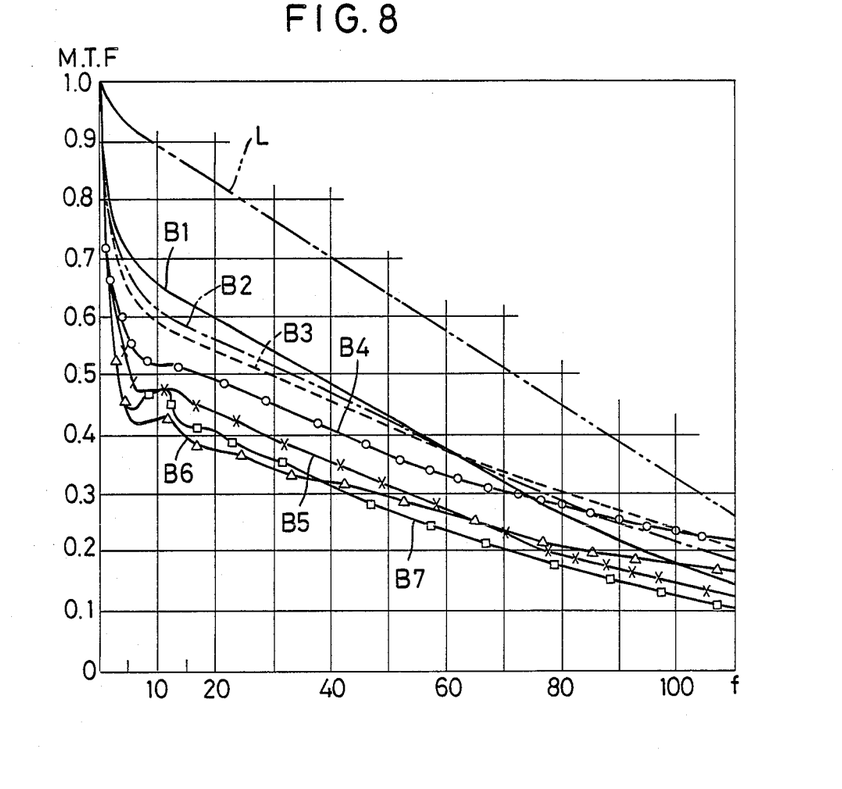

FIGS. 6–8 show spatial frequencies f (lines/mm) when these filters were mounted on an image focusing lens whose aberrations are satisfactorily corrected and which has a focal length f=63 mm and is stopped down to F-5.6. FIG. 6, especially, further shows the spatial frequency characteristics of conventional soft-focus filters, which were fabricated by the conventional ion-exchange process and which exhibited an effect substantially similar to that of a conventional photographic lens for soft-focus effect exposure, and the spatial frequency of an image focusing lens without a filter (f=63 mm and F-5.6) for the sake of comparison.

In FIG. 6, the curve L shows a M.T.F. curve of an image focusing lens (f=63 mm and F-5.6) whose optical aberrations are satisfactorily corrected and which has no filter mounted thereon. It is seen that the M.T.F. is decreased in value substantially in proportion to the spatial frequency. The curves $M_1$ and $M_2$ show M.T.F curves, respectively, for two types of soft-focus filters which were fabricated by the conventional ion-exchange process, which exhibited a soft-focus effect substantially similar to that of a soft-focus photographic lens, and which were mounted on the above-mentioned image focusing lens. The comparisons of the M.T.F curves $M_1$ and $M_2$ with the M.T.F curve L of the image focusing lens without a filter show that in the case of the high spatial frequency band, the values of M.T.F curves are almost the same, but in the case of the low spatial frequency band, their difference becomes large. It is apparent that for the two types of filters, a soft-focus effect can be obtained, in which the image contrast (M.T.F.) in the relatively high spatial frequency band is decreased with respect to that of an image focusing lens whose aberrations are satisfactorily corrected, and the image contrast (M.T.F) in the low spatial frequency band is further decreased relative to that of the focusing lens. The lower the image contrast in the low spatial frequency band, the higher the soft-focus effect becomes. In the case of the two types of filters, the filter which shows the M.T.F curve $M_2$ exhibits a higher soft-focus effect than the filter which shows the curve $M_1$.

The degree of soft focus effect varies according to a demand for obtaining a specific picture, preference of a user and so on. In order to (1) attain a clear soft-focus effect and (2) prevent a too high soft-focus effect, the inventors made extensive studies and experiments of the sizes of the lens-shaped projections 3 so that the M.T.F. curves of the soft-focus filters in accordance with the present invention exist between the M.T.F. curves $M_1$ and $M_2$ of the above-mentioned two model filters. The solid-line curve $A_1$ shown in FIG. 6 is the M.T.F. curve of the filters A3-16 whose lens-shaped projections have a diameter φ=0.5 mm a height h=0.9μ and which has the total area ratio S=16% as shown in TABLE 1. It is seen that the curve $A_1$ is almost the same as the M.T.F. curve $M_1$ of one of the two model filters. The one-dot-chain-line curve $A_2$ shows M.T.F. of the filter A3-20 whose lens shaped projections are the same in size as those of the filter A3-16 and which has the total area ratio S=24%. Both the characteristic curves $A_1$ and $A_2$ exist between the M.T.F. curves of the two model filters so that both of the filters A3-16 and A3-20 exhibit a satisfactory soft focus effect. The filter A3-20 having a greater lens-shaped-projection-area ratio S has a lower value of M.T.F. (which means that the image contrast is weak) than the filter A3-16 having a smaller area ratio S (average density) in the band in which the spatial frequency is 5–20 (lines/mm) and shows a high degree of soft filter effect.

FIG. 7 shows the spatial frequency characteristic curves of the filters from C5-16 to C5-30 whose lens-shaped projections are 8.5 mm in radius r and 1.8μ height h and 0.35 mm in diameter φ as shown in TABLE 1. The M.T.F. curve of an image focusing lens whose optical aberrations are satisfactorily corrected and which has a focal length f=63 mm, is stopped down to F-5.6 and has no filter mounted thereon is indicated by the two-dot-chain-line curve L. The spatial frequency characteristic of a filter C5-16 with S=16%. is indicated by the M.T.F. curve $C_1$; the spatial frequency characteristic of a filter C5=20 with S=20% is indicated by the curve $C_2$; the spatial frequency characteristic of a filter C5-25 with S=25% is indicated by the M.T.F. curve $C_3$; and the spatial frequency characteristic of a filter C5-30 with S=30% is indicated by the M.T.F. curve $C_4$. As is apparent from FIG. 7, the higher the area ratio (average density) S, the lower the values of M.T.F. become and the higher the degree of the soft focus effect. However, as in the cases of the curves $C_3$ and $C_4$, when the area ratio (average density) S of lens-shaped projections is increased beyond a predetermined value, the curves do not decline in the right direction in the band in which the spatial frequency is low and is of the order of 0–20 (lines/mm); they begin to fluctuate. When the fluctuation becomes great, the phase is reversed at a specific spatial frequency, so that a ring-shaped blur tends to occur frequently.

FIG. 8 shows the spatial frequency characteristics when the filters from B5-14 to B5-35 shown in TABLE 1 are mounted on an image focusing lens with f=63 mm and F=5.6. In this case, the lens-shaped projections 3 are 2.8 mm in radius r, 1.8μ in height and 0.20 mm in diameter φ. The curve L is the M.T.F. curve of an image focusing lens alone. The curves $B_1$, $B_2$, $B_3$ and $B_4$ represent M.T.F. curves, respectively, when the filters in accordance with the present invention have the area ratios S of 14%, 16%, 18% and 20%, respectively. The curves $B_5$, $B_6$ and $B_7$ represent the M.T.F. curves, respectively; when the filters in accordance with the present invention with the area ratios S of 25%, 30% and 35%, respectively, are mounted on the image focusing lens. When the area ratio (average density) of each lens-shaped projection is less than 20%, the characteristic curves incline monotonously downwardly in the right direction, but in the band in which the spatial frequency is low and is 0–20 (lines/mm), when the area ratio S is in excess of 25% the curves are disturbed and fluctuate. When S=30%, the value of M.T.F. in the spatial frequency range from 0 to 20 (lines/mm) becomes minimum (a maximum blur) as indicated by the curve $B_6$. When S=35%, the fluctuation of the curve becomes high, as indicated by the curve $B_7$ in the vicinity of the spatial frequency of 10 lines/mm, so that the ring-shaped blur begins to occur. Therefore when the ratio S (average density) of the total area of the lens-shaped projections to the whole light transmitting surface becomes in excess of 35%, a ring-shaped blur and a two-line blur are quite pronounced so that a beautiful soft-focus effect cannot be expected.

The filters as indicated in TABLE 1 were mounted on an image focusing lens whose aberrations are satisfactorily corrected and which has a focal length f=63 mm stopped down to F=5.6, so that the spatial frequency characteristic curves as shown in FIGS. 5–7 were obtained, and furthermore, actual test exposures were made. As a result, the following phenomena were observed:

1. The degree of the soft-focus effect has a high correlation with the area ratio S of the lens-shaped projections, but is less influenced by the difference in size between the lens-shaped projections. When the area ratio of the lens-shaped projections is small, the soft focus effect is weak, but the degree of blur is small. On the other hand, when the area ratio S is large, the degree of soft focus effect is enhanced, but the degree of blur is pronounced.

2. When the diameter $\phi$ of each lens-shaped projection is enlarged, the M.T.F. curve tends to undulate in the low spatial frequency band. Especially when the area ratio of the lens-shaped projections is high and the diameter $\phi$ becomes larger, undulations occur and the influence of such undulations can be observed as a ring-shaped blur when are actual exposure is made.

As a result of test exposures, the filters whose data are shown in TABLE 1 were found to attain a satisfactory effect depending upon a desired soft focus.

The above-described experimental results may be summarized as follows. When the diameter $\phi$ and the height h of the lens shaped projections satisfy the following conditions:

$$0.05 \text{ mm} \leq \phi \leq 0.5 \text{ mm} \tag{1}$$

and $$0.5\mu \leq h \leq 3\mu \tag{2}$$

the occurrence of ring-shaped blurs becomes less and a satisfactory soft-focused image is produced. If the lens-shaped projections are lower than the lower limits defined by the Eqs. (1) and (2), respectively and when the total area depending upon the diameter of each lens-shaped projection is less than 5% of the total light-transmission area of a filter, the soft-focus effect is too weak; that is, the object of mounting a soft-focus filter on an image focusing lens cannot be attained. If the lens-shaped projections become in excess of the upper limits defined by the above equations (1) and (2) and when the total area of the lens-like projections is less than 5% of the total light-transmission surface of a filter (that is, when the lens-like projections are large in size, but less in number), or if the total area of the lens-shaped projections are in excess of 35% of the total light-transmission surface of a filter, the soft-focus effect becomes too strong and the image contrast is extremely degraded. As a result, a satisfactory soft-focus effect cannot be obtained. In other words, the area ratio S (average density) must satisfy the following condition:

$$5\% \leq S \leq 35\% \tag{3}$$

Figure 9:
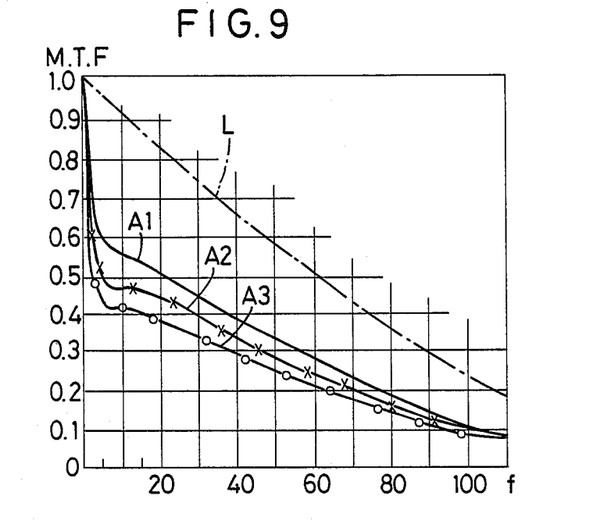
FIG. 9 shows spatial frequency characteristic curves when the aperture of the focusing lens used in obtaining the characteristic curves shown in FIG. 6 is stopped down to F-11.

In the cases of the filters in accordance with the present invention shown in TABLE 1, in order to prevent a drastic variation of the soft-focus effect in response to the variation of an aperture value, the lens-shaped projections 3 are arranged randomly on the surface of the filter as shown in FIG. 3, and furthermore, the areas of the lens-shaped projections to the peripheral area and to the center area of the filter become substantially the same. FIG. 9 shows the spatial frequency characteristic curves, respectively, when the filters A3-16, A3-20 and A3-24 whose data are shown in TABLE 1 were mounted on the image focusing lens with f=63 mm and F=11 reduced from F=5.6 which was used to obtain the M.T.F. curve shown in FIG. 6. In FIG. 9, curve L represents the M.T.F. curve of the image focusing lens alone which was stopped down to F=11. And the curves A1, A2 and A3 represent the M.T.F. curves, respectively, when the filters A3-16, A3-20 and A3-24 are mounted on the above-mentioned image focusing lens, respectively. As is clear from the comparison between FIGS. 6 and 9, the soft-focus effects obtained are almost the same. However, even when the area ratios (average density) S of the total area of the lens-shaped projections to the total light-transmission surface of the filters are substantially the same, the number of lens-shaped projections through which the light rays are transmitted are less when the image focusing lens is stopped down to F11 than when the lens is stopped down to F5.6, and the curves are slightly disturbed in the low spatial frequency band of 0–20 lines/mm. In FIG. 3, the circle indicated by the two-dot-chain line represents the light transmission area when the image focusing lens is stopped down to F/11. In addition, each filter must have at least 15 lens-shaped projections.

Figure 10:
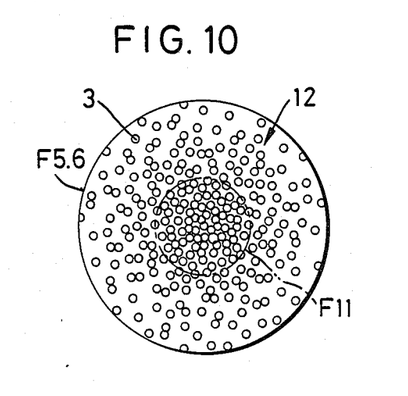
FIGS. 10 and 11 are two different preferred embodiments, respectively, of the present invention in which the distributions of the low-refractive-index portions each having a lens-shaped curved surface are different from that of the first preferred embodiment of the present invention shown in FIG. 3.
Figure 11:
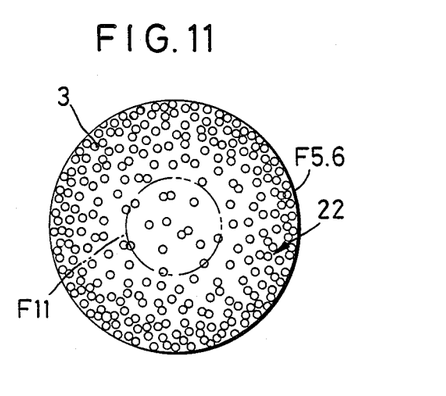

FIGS. 10 and 11 show two different type filters 12 and 22, respectively, in which the density of the lens-shaped projections at the center area is different from the density of the lens-shaped projections at the peripheral area of the filter. The circles indicated by the broken lines represent the light transmission areas, respectively, when the aperture is stopped down to F/11 from F/5.6. The sizes of the filters 12 and 22 are shown in TABLE 2, but the area ratio S (average density) of the total area of the lens-shaped projections to the whole light transmission surface is 20% in both filters 12 and 22.

TABLE 2

| Specimen marks | Mark of a MTF curve | Lens-shaped projections | | r (mm) | h (μ) | Φ (mm) | Total area ratio S (%) |
| --- | --- | --- | --- | --- | --- | --- | --- |
| | | distributions | | | | | |
| | | (central area) | (peripheral area) | | | | |
| A5-20 (center density) | $B_{41}$ | high density | low density | 2.8 | 1.8 | 0.20 | 20 |
| A5-20 (outer density) | $B_{42}$ | low density | high density | | | | |

Figure 12:
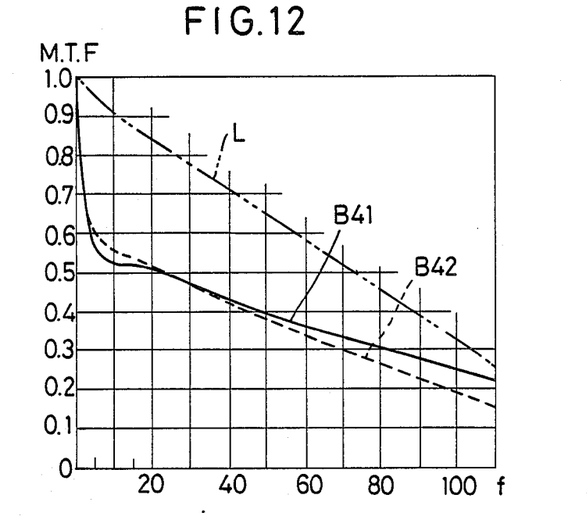
FIG. 12 shows spatial frequency characteristic curves obtained when the optical elements shown in FIGS. 10 and 11 are attached to an image focusing lens whose aperture is set at F-5.6.
Figure 13:
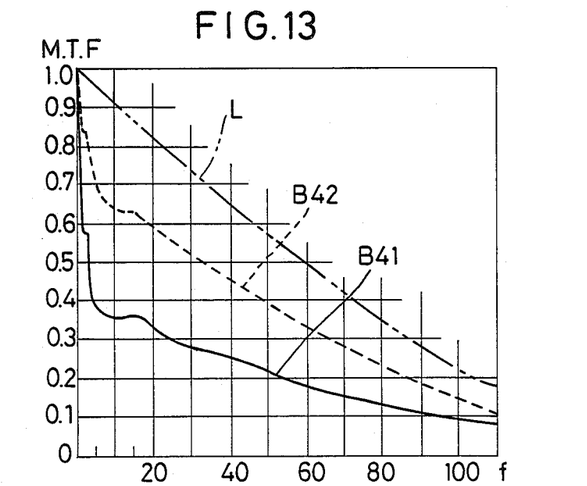
FIG. 13 shows spatial frequency characteristic curves obtained when the optical elements shown in FIGS. 10 and 11 are mounted on the focusing lens which is used to obtain the characteristic curves as shown in FIG. 12 and whose aperture is set at F-11.

FIG. 12 shows the spatial frequency characteristic curves when the filters shown in TABLE 2 were mounted on an image focusing lens which has a focal length—63 mm and is stopped down to F/5.6 and whose optical aberrations are satisfactorily corrected. In FIG. 12, the curve L represents the M.T.F. curve of the image focusing lens alone; the curve $B_{41}$ represents the M.T.F. curve for the filter which has a high density of the lens-shaped projections at the central area while a low density at the outer peripheral area as shown in FIG. 10; and the curve $B_{42}$ indicates the M.T.F. curve obtained when the filter has a low density of lens-shaped projections at the central area and a high density at the outer peripheral area as shown in FIG. 11. Both filters show almost similar contrasts (M.T.F. values) at a low spatial frequency band so that their soft-focus effects are substantially similar. FIG. 13 shows the spatial frequency characteristic diagram when the filters whose data are shown in TABLE 2 were mounted on the above-described image focusing lens whose aperture was stopped down to F/11. In FIG. 13, the curve L represents the M.T.F. curve of the image focusing lens alone which was stopped down to F/11. When the aperture was stopped down to F/11 and when the filter having a high density of lens-shaped projections at the central portion of the image focusing lens was mounted, the M.T.F. value was drastically decreased in a low spatial frequency band of 0–20 lines/mm as compared with the curves shown in FIG. 12 so that the soft-focus effect becomes great. It is also seen that when the filter which has a high lens-shaped projection density at the outer peripheral area was mounted the soft-focus effect was slightly weakened, as indicated by the curve $B_{42}$ as compared with FIG. 12.

As seen from the results of the experiments conducted by the inventors in which the filters whose data are shown in TABLE 2 were mounted on an image focusing lens, a filter whose density (the area ratio) of the lens-shaped projections is varied suitably from the outer peripheral area to the center area produces a degree of the soft-focus effect that can be freely controlled in response to the setting of the aperture of the image focusing lens. In the case of the embodiments shown in FIGS. 10 and 11 and TABLE 2, the density of the lens-shaped projections at the central area is varied from that at the outer peripheral area by varying the number or distribution of the lens-shaped projections of the same size, but the density can be varied by varying the diameter $\phi$ of the projections.

The filters in accordance with the present invention whose data are shown in TABLES 1 and 2, respectively, were designed and fabricated in such a way that lens-shaped projections of the same size are uniformly distributed over the surfaces of the filters or the density is varied gradually from the central portion to the outer peripheral portion, but it is to be understood that it is not necessary to use lens-shaped projections different in size when the above-described Eqs. (1) and (2) are satisfied. In the above-described embodiments, a plurality of lens-shaped projections are extended from one major surface of a transparent plate as shown in FIG. 4, but as shown in FIG. 1 the underlying principle of attaining the soft focus effect is based upon the fact that the light rays passing through these lens-shaped projections are de-focused at the focal plane of an image focusing lens, so that instead of using the lens-shaped projections, a plurality of lens-shaped recesses can be formed in the surface of a transparent plate. In the latter case, the above-explained height h becomes the depth of a lens-shaped recess. In addition, it is not necessary that the lens-shaped projections or recesses have a completely spherical surface they may have an aspheric surface.

The above-described filters can be easily fabricated by molding colorless transparent plastic materials and instead of extending the lens-shaped projections from only one major surface of a filter, they can be extended from both major surfaces thereof. In the latter case, it is quite apparent that the ratio S of the total surface area of the lens-shaped projections extended from both the major surfaces to the light-transmission area of a filter must satisfy Eq. (3).

In addition, instead of mounting the soft focus optical element in accordance with the present invention at a position behind the image focusing lens as shown in FIG. 1, it may be mounted at a front or intermediate position of an image focusing lens. In this case, if the luminous fluxes are not parallel to each other at a position at which a soft effect filter is mounted, the plane above which an image is focused is deviated in the direction of the optic axis, so that it is preferable that one major surface having no lens-shaped projections be defined to have a suitable lens surface, so that the defects caused by the non-parallel luminous fluxes can be eliminated. Furthermore, only the lens-shaped projections (or recesses) may be colored, for instance, in magenta, so that the face and the skin of a portrait can have the soft focus effect. Alternatively, they may be colored in green so that, as in the case of an exposure for taking a photo, a portion which is mainly blue in color is soft-focused so as to enhance a stream or a front landscape. Therefore, according to the present invention, soft focus filters for obtaining special effects can be provided.

Furthermore, the present invention is not limited to soft focus optical elements which are so designed and fabricated as to have a plurality of lens-shaped surfaces over the surface of a transparent plate and which are adapted to be mounted on the photographic lenses like soft focus filters. It is to be understood that a soft focus optical element in accordance with the present invention can be designed and fabricated to have a converging or diverging lens-shaped element as a whole and may be used as an optical element in a photographic lens, so that it is one optical component of a soft-focus photographic lens exclusively used to attain a soft focus effect.

We claim:

1. A soft-focus optical element comprising a plurality of lens-shaped portions formed on a light transmitting surface of a transparent optical element, said soft-focus optical element being designed and fabricated to satisfy the following relations:

$$0.05 \text{ mm} \leq \phi \leq 0.5 \text{ mm}$$

$$0.5\mu \leq h \leq 3\mu$$

and $$5\% \leq S \leq 35\%$$

where $\phi$: the diameter of each of said lens-shaped portions, h: the distance between said light-transmitting surface of said transparent element and the vertex of a lens-shaped surface of each of said lens-shaped portions and S: the ratio of the total area occupied by said plurality of lens-shaped portions to the area of said light-transmitting surface.

2. A soft-focus optical element as set forth in claim 1, wherein said plurality of lens-shaped portions are randomly distributed over said light transmitting surface.

3. A soft-focus optical element as set forth in claim 1, wherein said plurality of lens-shaped portions are different in density between the central portion and the outer peripheral portion of said light-transmitting surface.

4. A soft-focus optical element as set forth in claim 1, wherein each of said lens-shaped portions is a lens-shaped projection extended from said light-transmitting surface, and each projection is designed and fabricated in such a manner that $\phi = 0.15$ mm and $h = 0.9\mu$ and the ratio S satisfies the following condition:

$$16\% \leq S \leq 24\%.$$

5. A soft-focus optical element as set forth in claim 1, wherein said lens-shaped portions are lens-shaped projections extended from said light-transmitting surface, and said lens-shaped projections are designed and fabricated to have $\phi = 0.2$ mm and $h = 1.8\mu$ and the ratio S satisfies the following condition:

$$14\% \leq S \leq 35\%.$$

6. A soft-focus optical element as set forth in claim 1, wherein said lens-shaped portions are lens-shaped projections, and said lens-shaped projections are designed and fabricated to have $\phi = 0.35$ mm and $h = 1.8\mu$ and the ratio S satisfies the following condition:

$$16\% \leq S \leq 30\%.$$

7. A soft-focus optical element comprising:

a transparent optical element having a light-transmitting surface; and a plurality of lens-shaped portions randomly distributed on said light-transmitting surface, each of said plurality of lens-shaped portions having a lens-shaped surface and being integrated with said transparent optical element;

said transparent optical element and said plurality of lens-shaped portions being designed and fabricated to satisfy the following relations:

$$0.05 \text{ mm} \leq \phi \leq 0.5 \text{ mm}$$

$$0.5\mu \leq h \leq 3\mu$$

and $$5\% \leq S \leq 35\%$$

where $\phi$: the diameter of each of said lens-shaped portions, h: the distance between said light-transmitting surface of said transparent element and the vertex of said lens-shaped surface of each of said lens-shaped portions and S: the ratio of the total area occupied by said plurality of lens-shaped portions to the area of said light-transmitting surface.

8. A soft-focus optical element as set forth in claim 7, wherein said plurality of lens-shaped portions are different in density between the central portion and the outer peripheral portion of said light-transmitting surface.

9. A soft-focus optical element as set forth in claim 7, wherein said lens-shaped portions are projections from said light-transmitting surface.

* * * * *